United States Patent
Artmeier et al.

(10) Patent No.: US 12,115,834 B2
(45) Date of Patent: Oct. 15, 2024

(54) ADJUSTABLE STEERING-WHEEL VENTILATION

(71) Applicant: Bayerische Motoren Werke Aktiengesellschaft, Munich (DE)

(72) Inventors: Felix Artmeier, Munich (DE); Stefan Wiedemann, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 37 days.

(21) Appl. No.: 16/763,817

(22) PCT Filed: Oct. 29, 2018

(86) PCT No.: PCT/EP2018/079598
§ 371 (c)(1),
(2) Date: May 13, 2020

(87) PCT Pub. No.: WO2019/096572
PCT Pub. Date: May 23, 2019

(65) Prior Publication Data
US 2020/0369109 A1 Nov. 26, 2020

(30) Foreign Application Priority Data
Nov. 14, 2017 (DE) ...................... 10 2017 220 264.5

(51) Int. Cl.
*B60H 1/00* (2006.01)
*B60H 1/34* (2006.01)

(52) U.S. Cl.
CPC ....... *B60H 1/00292* (2013.01); *B60H 1/3407* (2013.01); *B60H 2001/003* (2013.01);
(Continued)

(58) Field of Classification Search
CPC .............. B60H 1/00292; B60H 1/3407; B60H 1/00564; B60H 1/3414; B60H 2001/003;
(Continued)

(56) References Cited

U.S. PATENT DOCUMENTS

| 4,562,957 A | * | 1/1986 | Nakagawa | ........... B60H 1/2225 219/202 |
| 4,679,730 A | * | 7/1987 | Uchida | ................ B60H 1/2225 237/12.3 A |

(Continued)

FOREIGN PATENT DOCUMENTS

| CN | 102811880 A | 12/2012 |
| CN | 107000537 A | 8/2017 |

(Continued)

OTHER PUBLICATIONS

Prieser, DE 19529451 Prieser 1996 Espacenet machine translation, Nov. 28, 1996, German Patent and Trade Mark Office (Year: 1996).*

(Continued)

*Primary Examiner* — Steven S Anderson, II
(74) *Attorney, Agent, or Firm* — Crowell & Moring LLP

(57) ABSTRACT

A steering-wheel ventilation device for a vehicle includes a steering wheel, a ventilation device which is arranged behind the steering wheel and has a ventilation duct which has a first outlet for discharging an air flow directly towards a vehicle occupant sitting in front of the steering wheel and a second outlet for discharging a diffuse air flow. The ventilation duct is configured to discharge an air flow either via the first outlet and/or the second outlet.

7 Claims, 2 Drawing Sheets

(52) U.S. Cl.
CPC ........ *B60H 1/00564* (2013.01); *B60H 1/3414* (2013.01); *B60H 2001/3478* (2013.01)

(58) Field of Classification Search
CPC ........ B60H 2001/3478; B60H 1/00592; B60H 1/3421; B60H 1/3428; B60H 1/247; B60H 2001/3464; B60H 1/00842; B60H 2001/00214; B60H 1/242; B60H 2001/002; B26D 1/065; B26D 25/142; F24F 11/79; F24F 13/075; F24F 13/10; F24F 13/1413; F24F 13/142; F24F 2013/1473; F24F 13/0236; F24F 13/1426; B62D 1/065
USPC ......................................... 454/155, 152, 153
See application file for complete search history.

(56) References Cited

U.S. PATENT DOCUMENTS

| | | | | |
|---|---|---|---|---|
| 5,129,859 | A * | 7/1992 | Yagi | B60H 1/00871 137/875 |
| 5,342,173 | A * | 8/1994 | Vera | F04D 19/002 416/169 A |
| 6,007,420 | A * | 12/1999 | Harm | B60H 1/00292 454/140 |
| 6,179,707 | B1 * | 1/2001 | Arold | B60H 1/3407 454/150 |
| 6,347,987 | B1 | 2/2002 | Ichishi et al. | |
| 7,614,682 | B1 * | 11/2009 | Major | B60H 1/00292 296/154 |
| 9,175,873 | B2 * | 11/2015 | Sheldon | F24F 13/1413 |
| 2004/0031279 | A1 | 2/2004 | Kamiya et al. | |
| 2007/0017194 | A1 * | 1/2007 | Gehring | B60H 1/3407 55/505 |
| 2011/0272131 | A1 * | 11/2011 | Mikat | B60H 1/00742 236/91 C |
| 2013/0023192 | A1 | 1/2013 | Niwa et al. | |
| 2015/0158370 | A1 * | 6/2015 | Glaser | B62D 1/04 264/46.4 |
| 2017/0144689 | A1 * | 5/2017 | Peng | B60H 1/00292 |
| 2017/0334263 | A1 | 11/2017 | Schumacher et al. | |
| 2018/0043752 | A1 * | 2/2018 | Motomura | B60H 1/3414 |

FOREIGN PATENT DOCUMENTS

| | | | | |
|---|---|---|---|---|
| DE | 43 00 910 | A1 | 3/1994 | |
| DE | 43 27 266 | C1 | 8/1994 | |
| DE | 19529451 | C1 * | 11/1996 | ......... B60H 1/00842 |
| DE | 199 56 259 | A1 | 6/2000 | |
| DE | 199 18 515 | A1 | 10/2000 | |
| DE | 103 36 586 | A1 | 2/2004 | |
| DE | 10 2007 057 166 | A1 | 5/2009 | |
| DE | 10 2013 215 172 | A1 | 2/2014 | |
| DE | 10 2015 200 227 | A1 | 7/2016 | |
| JP | 2006-240512 | A | 9/2006 | |
| JP | 2015-20566 | A | 2/2015 | |
| KR | 20160137614 | A * | 11/2016 | |
| WO | WO 2016/143455 | A1 | 9/2016 | |

OTHER PUBLICATIONS

International Search Report (PCT/ISA/210) issued in PCT Application No. PCT/EP2018/079598 dated Feb. 13, 2019 with English translation (five (5) pages).
German-language Written Opinion (PCT/ISA/237) issued in PCT Application No. PCT/EP2018/079598 dated Feb. 13, 2019 (five (5) pages).
German-language Search Report issued in German Application No. 10 2017 220 264.5 dated May 30, 2018 with partial English translation (13 pages).
English translation of Chinese-language Office Action issued in Chinese Application No. 201880069314.3 dated Nov. 1, 2022 (seven (7) pages).

* cited by examiner

ADJUSTABLE STEERING-WHEEL VENTILATION

BACKGROUND AND SUMMARY OF THE INVENTION

The present invention relates to a steering wheel ventilation apparatus for a vehicle, preferably for a motor vehicle or commercial vehicle.

A steering wheel ventilation apparatus with a ventilation device is known from the prior art, for example, from U.S. Pat. No. 4,562,957 B. It is possible by way of the ventilation device of U.S. Pat. No. 4,562,957 B which is arranged behind a steering wheel to guide an air flow directly in the direction of a vehicle occupant via a region between the steering column and the steering wheel. Here, the direction of the air flow can be set via adjustable air guiding elements of the ventilation device.

Furthermore, a steering wheel ventilation apparatus which is similar to that described in U.S. Pat. No. 4,562,957 B is known from U.S. Pat. No. 4,679,730 B. In the case of the steering wheel ventilation apparatus of U.S. Pat. No. 4,679,730 B, a ventilation device is provided, the ventilation device likewise being arranged behind the steering wheel and being configured in such a way that an air flow is divided via respective ducts with corresponding outlets into three air flows and is discharged in the direction of the steering wheel.

In the case of the abovementioned steering wheel ventilation apparatuses of U.S. Pat. Nos. 4,562,957 B and 4,679,730 B, it is therefore provided only to guide an air flow directly in the direction of the vehicle occupant into the region between the steering wheel column and the steering wheel. If, for example, an excessive cooling effect occurs for the vehicle occupant as a result, the vehicle occupant can at most switch off the operation of the ventilation apparatuses or can optionally change the flow direction slightly.

The invention is therefore based on the object of providing a steering wheel ventilation apparatus which, in comparison with the steering wheel ventilation apparatuses which are known from the prior art, can be adapted in a more flexible manner to the requirements of a vehicle occupant.

The object is achieved by way of a steering wheel ventilation apparatus according to the claimed invention.

A steering wheel ventilation apparatus according to the invention is provided for a vehicle, preferably for a motor vehicle or commercial vehicle, the steering wheel ventilation apparatus according to the invention comprising: a steering wheel, a ventilation device which is arranged behind the steering wheel and has a ventilation duct which has a first outlet for discharging an air flow directly in the direction of a vehicle occupant seated in front of the steering wheel, and a second outlet for discharging a diffuse air flow, the ventilation duct being set up to discharge an air flow selectively via the first outlet and/or the second outlet.

The air flow which exits directly in the direction of the vehicle occupant preferably has a constant flow cross section in the flow direction. This is therefore preferably a laminar air flow.

In the case of the diffuse air flow, the flow cross section preferably increases in the flow direction. Accordingly, the vehicle occupant is not blown at with the intensity as in the case of the direct air flow.

By virtue of the fact that the direct air flow or the diffuse air flow can be discharged selectively via one or both outlets, the steering wheel ventilation apparatus according to the invention can be adapted in a more flexible manner to the requirements of the vehicle occupant. This can increase the ventilation comfort for the vehicle occupant, since the air flow is no longer necessarily discharged directly, but rather can also be discharged in a diffuse manner, which in turn can lead to a homogeneous distribution of the air flow in the interior compartment and specifically around the steering wheel.

Furthermore, the steering wheel ventilation apparatus according to the invention can be configured in such a way that the ventilation duct is set up to adjust an air flow in such a way that the air flow is discharged only via the first outlet, in order to be guided directly in the direction of the vehicle occupant, and/or that the air flow is discharged only via the second outlet, in order to be distributed diffusely into the surroundings of the steering wheel, and/or that the air flow is discharged in a distributed manner via the first outlet and the second outlet.

Furthermore, the steering wheel ventilation apparatus according to the invention can be configured in such a way that the ventilation device is arranged centrally behind the steering wheel.

Moreover, the steering wheel ventilation apparatus according to the invention can be realized in such a way that the first outlet has one or more first openings which are set up in such a way that the air flow exits from the plurality of first openings and flows directly in the direction of the vehicle occupant with an approximately constant flow cross section.

The first openings of the first outlet can be configured in a slot-shaped manner by way of a grille.

Furthermore, the steering wheel ventilation apparatus according to the invention can be developed in such a way that the second outlet has one or more second openings which are set up in such a way that the air flow exits from the plurality of second openings and is distributed diffusely in the surroundings of the steering wheel with a flow cross section which increases in the flow direction.

Furthermore, the steering wheel ventilation apparatus according to the invention can be realized in such a way that the ventilation duct is divided into a first duct with the first outlet and a first flap for adjusting a flow cross section, and into a second duct with the second outlet and a second flap for adjusting a flow cross section, the first flap and the second flap being connected to one another via an acting mechanism in such a way that the first flap and the second flap can be adjusted only together at least partially.

Moreover, the steering wheel ventilation apparatus according to the invention can be configured in such a way that the first flap is connected directly to a motor or actuator for controlling the first flap, and the second flap is connected indirectly via the acting mechanism to the motor or the actuator.

Furthermore, the steering wheel ventilation apparatus according to the invention can be configured in such a way that the acting mechanism is set up to assume a first position, in the case of which the first outlet is open completely via the first flap, whereas the second outlet is closed completely via the second flap.

Furthermore, the steering wheel ventilation apparatus according to the invention can be configured in such a way that the acting mechanism is set up to assume a second position, in the case of which the first outlet is closed completely via the first flap, whereas the second outlet is closed partially or open partially via the second flap.

Moreover, the steering wheel ventilation apparatus according to the invention can be developed in such a way that the acting mechanism is set up to assume a third position, in the case of which the first outlet is closed partially via the first flap, whereas the second outlet is closed partially via the second flap.

Furthermore, the steering wheel ventilation apparatus according to the invention can be realized in such a way that the second flap is set up, in addition to closing and opening the second outlet, to also close the first outlet completely, the acting mechanism being set up to assume a fourth position, in the case of which the first outlet is closed completely via the second flap, whereas the second outlet is open completely via the second flap.

Furthermore, the steering wheel ventilation apparatus is preferably configured in such a way that the ventilation duct is arranged in an arcuate manner above and/or below a steering wheel column which is arranged behind the steering wheel.

In the following text, one preferred embodiment of the invention will be described by way of example with reference to the figures.

DETAILED DESCRIPTION OF THE DRAWINGS

Figure 1:
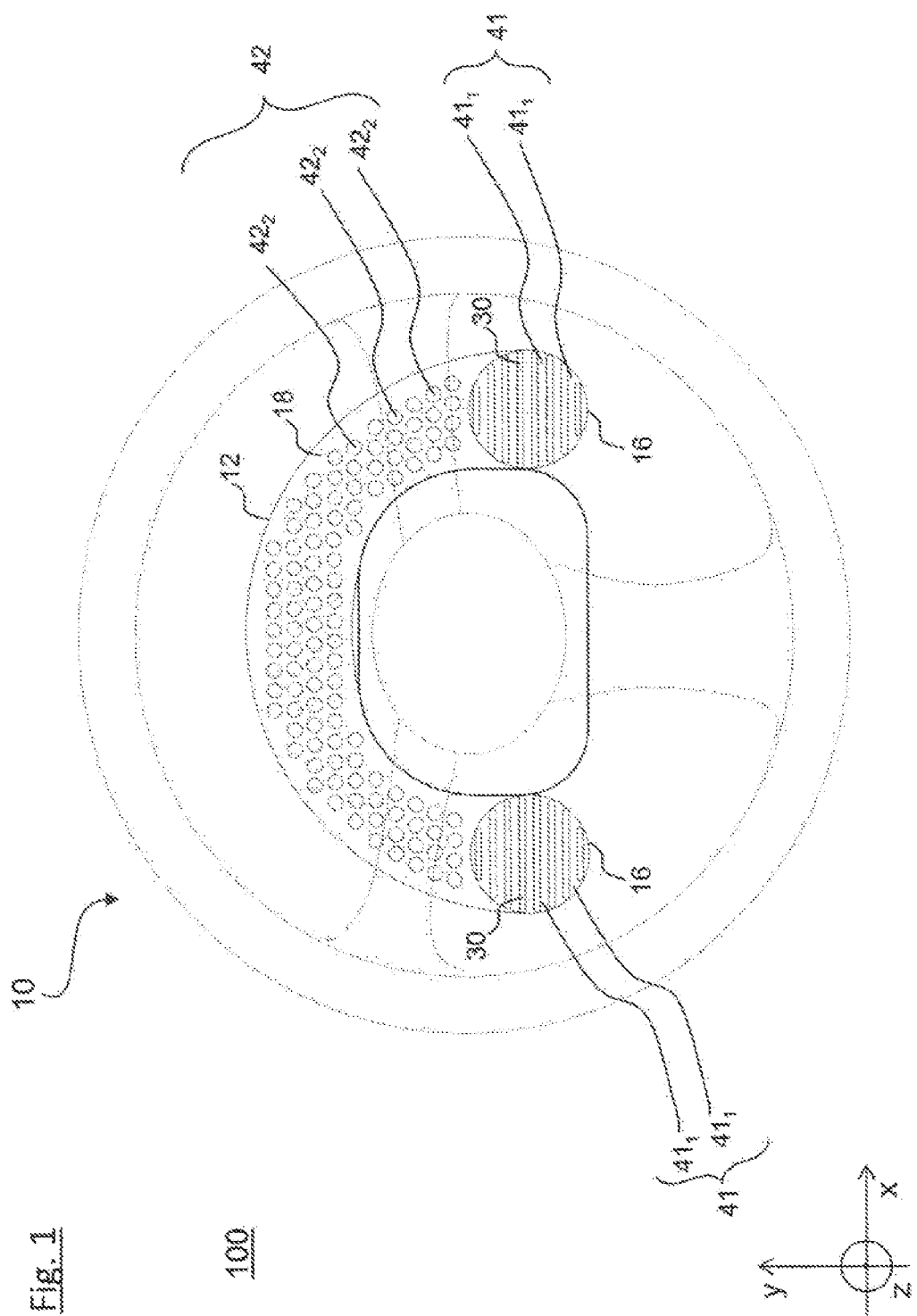
FIG. 1 is a diagrammatic view of a steering wheel ventilation apparatus according to the invention for a vehicle in accordance with one preferred embodiment of the invention.

FIG. 1 is a diagrammatic view of a steering wheel ventilation apparatus 100 according to the invention for a vehicle, which steering wheel ventilation apparatus 100 is provided for a motor vehicle or commercial vehicle in this exemplary embodiment.

The steering wheel ventilation apparatus 100 comprises a conventional steering wheel 10 and a ventilation device 12.

Figure 2:
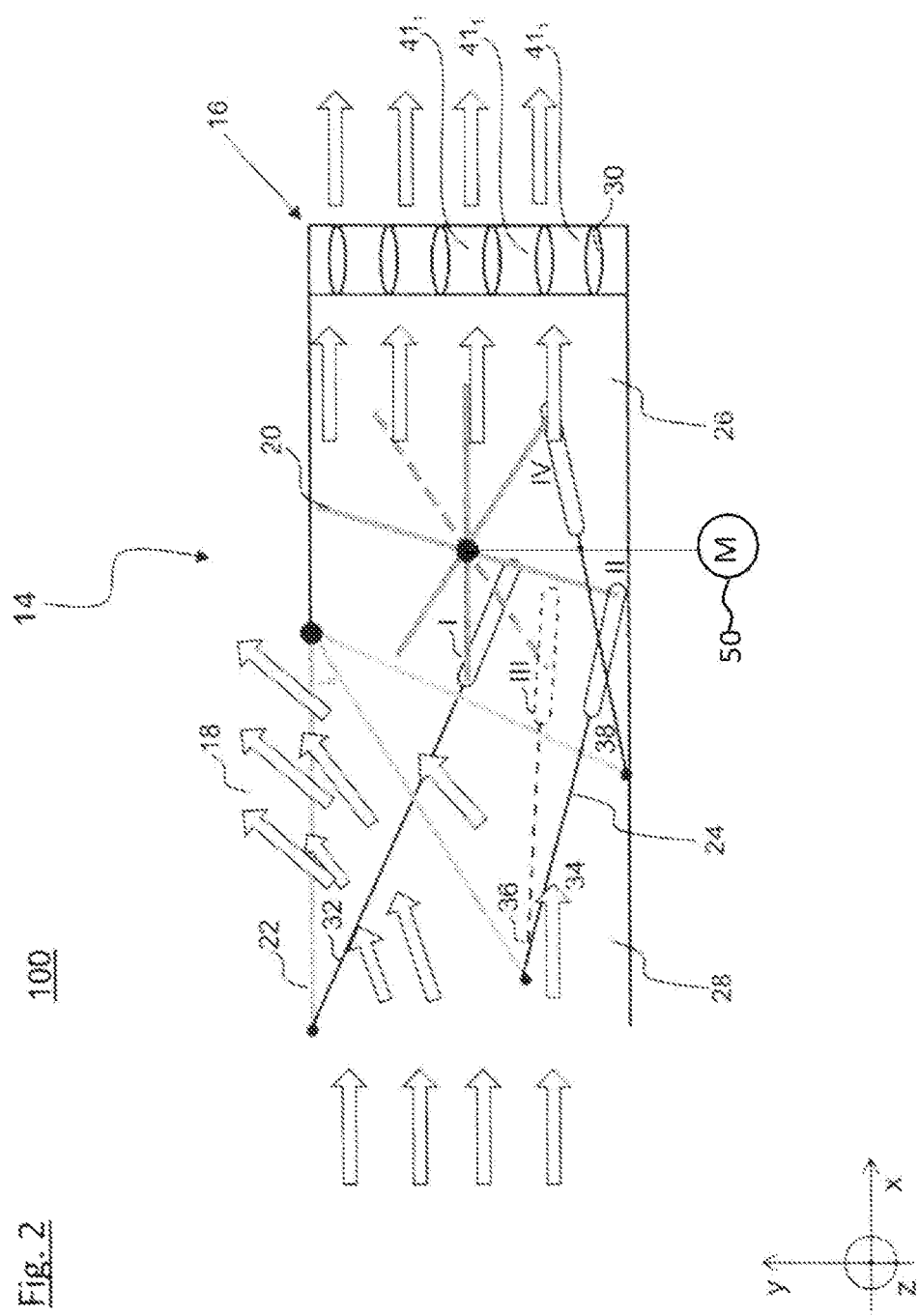
FIG. 2 is a diagrammatic illustration of the steering wheel ventilation apparatus according to the invention from FIG. 1.

The ventilation device 12 is arranged centrally behind the steering wheel, as illustrated in FIG. 1, and has a ventilation duct 14, as FIG. 2 illustrates diagrammatically. The ventilation duct 14 is preferably arranged in an arcuate manner above a steering wheel column or steering wheel column cover which is arranged behind the steering wheel 10 and is not shown here.

As can be gathered from FIG. 2, the ventilation duct 14 comprises a first outlet 16 for discharging an air flow directly in the direction of a vehicle occupant seated in front of the steering wheel 10, and a second outlet 18 for discharging a diffuse air flow. Here, the ventilation duct 14 is set up to discharge an air flow selectively via the first outlet 16 and the second outlet 18.

Here, the second outlet 18 is arranged above the first outlet 16, as can be seen, in particular, in FIG. 1 and is indicated merely diagrammatically in FIG. 2.

In this exemplary embodiment, the ventilation duct 14 is set up, in particular, to adjust the air flow in such a way that the air flow is discharged only via the first outlet 16, in order to be guided directly in the direction of the vehicle occupant, and that the air flow is discharged only via the second outlet 18, in order to be distributed diffusely into the surroundings of the steering wheel 10, and that the air flow is discharged in a distributed manner via the first outlet 16 and the second outlet 18, as will be described in greater detail in the following text. For this purpose, the ventilation duct 14 is divided into a first duct 26 with the first outlet 16 and into a second duct 28 with the second outlet 18.

In order to guide the air flow directly in the direction of the vehicle occupant, the first outlet 16 has a plurality of first openings $41_1$ (all of the first openings $41_1$ are denoted only by 41 for the sake of simplicity), as shown in FIG. 1, the first openings 41 being set up in such a way that the air flow can exit from them and in the process can flow directly in the direction of the vehicle occupant with an (approximately) constant flow cross section of the air flow. This is preferably a laminar air flow.

In this exemplary embodiment, the first openings 41 are configured by way of a grille 30 at the end of the first outlet 16, with the result that the first openings 41 are formed in the form of horizontal slots.

In order to distribute the air flow diffusely into the surroundings of the steering wheel 10, the second outlet 18 has a plurality of second openings $42_2$ (all of the second openings $42_2$ are denoted only by 42 for the sake of simplicity), the second openings 42 being set up in such a way that the air flow can exit from them and can be distributed diffusely in the surroundings of the steering wheel 10 with a flow cross section which increases in the flow direction. This is preferably a turbulent air flow.

As can be gathered, furthermore, from FIG. 2, the ventilation duct 14 is divided, in particular, into a first duct 26 with the first outlet 16 and a first flap 20 for setting a flow cross section, and into a second duct 28 with the second outlet 18 and a second flap 22 for setting a flow cross section. Here, the first flap 20 and the second flap 22 are connected to one another via an acting mechanism 24 in such a way that the first flap 20 and the second flap 22 can be adjusted only together at least partially, as will be described in greater detail in the following text.

In this exemplary embodiment, the first flap 20 is connected directly to a motor or actuator 50 (shown schematically) for controlling the first flap 20, and the second flap 22 is connected to the motor or the actuator indirectly via the acting mechanism 24.

Using the construction, that is to say the interaction of the acting mechanism 24 with the first flap 20 and the second flap 22, different air flow guides can be realized on the basis of different positions of the acting mechanism 24 in conjunction with the first and second flap 20, 22. For example, the acting mechanism 24 is configured as a rigid guide with a slot at one end of the guide. Here, a pin which is provided on the first flap 20 is inserted, for example, into the slot at the one end of the guide such that it can be rotated and moved translationally with regard to the slot, whereas the second flap 22 is connected purely rotationally in a suitable manner to the other end of the guide.

As illustrated in FIG. 2, the acting mechanism 24 is set up to assume a first position I, in the case of which the first outlet 16 is open completely via the first flap 20, that is to say the flow cross section is at a maximum, whereas the second outlet 18 is closed completely via the second flap 22, that is to say the flow cross section is zero. As can be seen, furthermore, in FIG. 2, it is possible, in the case of the first position I, to further change the position of the first flap 20, since the second flap 22 can be held in its position, for example by means of a spring (not shown), and the pin which is inserted into the slot can be moved translationally within the slot, which results in a rotation of the first flap 20. In this way, the intensity of the air flow which flows out of the first outlet 16 can be set, whereas the second flap 22 is closed completely.

Furthermore, the acting mechanism 24 is set up to assume a second position II, in the case of which the first outlet 16 is closed completely via the first flap 20, that is to say the flow cross section is zero, whereas the second outlet 18 is open/closed partially via the second flap 22, that is to say a predefined, preferably medium flow cross section is achieved.

Furthermore, the acting mechanism 24 is set up to assume a third position III, in the case of which the first outlet 16 is open/closed partially via the first flap 20, that is to say a predefined, preferably medium flow cross section is achieved, whereas the second outlet 18 is open/closed partially via the second flap 22, that is to say a predefined, preferably medium flow cross section is achieved.

Moreover, the acting mechanism can also assume a fourth position IV. For this purpose, the second flap 22 is set up, in addition to closing and opening the second outlet 18, to also close the first outlet 16 completely. As a result, the acting mechanism 24 is set up to assume the fourth position IV, in the case of which the first outlet 16 is closed completely via the second flap 22, that is to say the flow cross section is zero, whereas the second outlet 18 is open completely via the second flap 22, that is to say the flow cross section is at a maximum.

The features of the invention which are disclosed in the above description, in the drawings and in the claims can be essential for the implementation of the invention both individually and in any desired combination.

LIST OF DESIGNATIONS

10 Steering wheel
12 Ventilation device
14 Ventilation duct
16 First outlet
18 Second outlet
20 First flap
22 Second flap
24 Acting mechanism
26 First duct
28 Second duct
30 Grille
I First position
II Second position
III Third position
IV Fourth position
41 First opening
41$_1$ First (part) openings
42 Second opening
42$_2$ Second (part) openings

What is claimed is:

1. A steering wheel ventilation apparatus for a vehicle, the steering wheel ventilation apparatus comprising:
   a steering wheel;
   a ventilation device which is arranged behind the steering wheel and has a ventilation duct with a first outlet for discharging an air flow directly in a direction of a vehicle occupant seated in front of the steering wheel, and a second outlet for discharging a diffuse air flow, wherein
      the ventilation duct is configured to discharge an air flow selectively via the first outlet and/or the second outlet,
      the ventilation duct is divided into a first duct with the first outlet and a first flap for adjusting a flow cross section, and into a second duct with the second outlet and a second flap for adjusting a flow cross section,
      the first flap and the second flap are connected to one another via an acting mechanism such that the first flap and the second flap are adjustable only together at least partially,
      the acting mechanism is configured to assume a first position, in the case of which the first outlet is open completely via the first flap, whereas the second outlet is closed completely via the second flap,
      the acting mechanism is configured to assume a second position, in the case of which the first outlet is closed completely via the first flap, whereas the second outlet is closed partially via the second flap,
      the acting mechanism is configured to assume a third position, in the case of which the first outlet is closed partially via the first flap, whereas the second outlet is closed partially via the second flap,
      the second flap is configured, in addition to closing and opening the second outlet, to also close the first outlet completely, and
      the acting mechanism is configured to assume a fourth position, in the case of which the first outlet is closed completely via the second flap, whereas the second outlet is open completely via the second flap.

2. The steering wheel ventilation apparatus according to claim 1, wherein
   the ventilation duct is further configured to adjust the air flow such that:
   (i) the air flow is discharged only via the first outlet, in order to be guided directly in the direction of the vehicle occupant,
   (ii) the air flow is discharged only via the second outlet, in order to be distributed diffusely into the surroundings of the steering wheel, and/or
   (iii) the air flow is discharged in a distributed manner via the first outlet and the second outlet.

3. The steering wheel ventilation apparatus according to claim 1, wherein
   the ventilation device is arranged centrally behind the steering wheel.

4. The steering wheel ventilation apparatus according to claim 1, wherein
   the first flap is connected directly to a motor or actuator for controlling the first flap, and
   the second flap is connected indirectly via the acting mechanism to the motor or the actuator.

5. The steering wheel ventilation apparatus according to claim 1, wherein
   the ventilation duct is arranged in an arcuate manner above and/or below a steering wheel column which is arranged behind the steering wheel.

6. The steering wheel ventilation apparatus according to claim 1, wherein
   the vehicle is a motor or commercial vehicle.

7. The steering wheel ventilation apparatus according to claim 1, wherein
   the diffuse air flow provides a homogenous distribution of the air flow around the steering wheel.

* * * * *